April 19, 1966 V. G. BETAR 3,246,626
METALLIZING FILAMENT
Filed Dec. 16, 1960
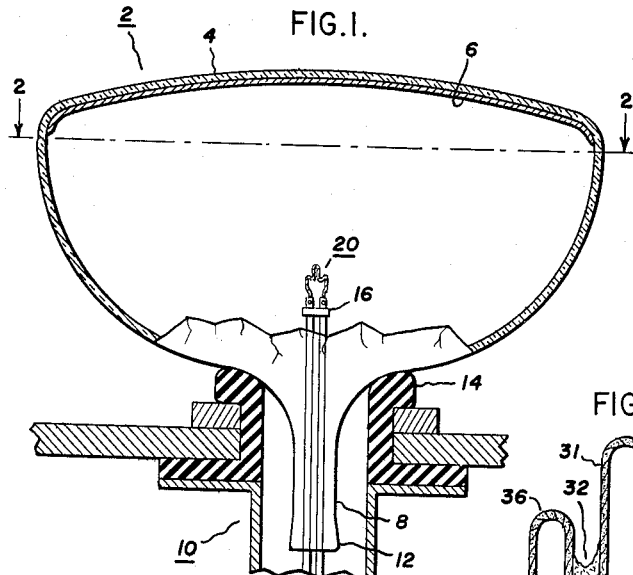
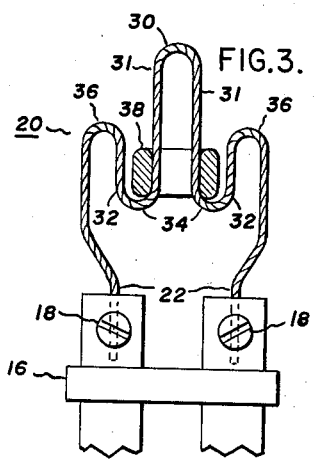
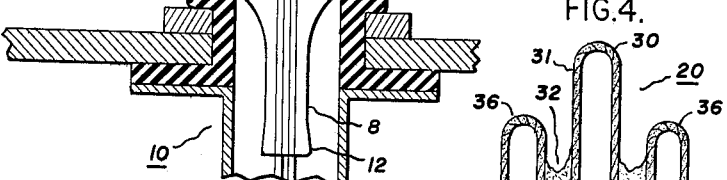
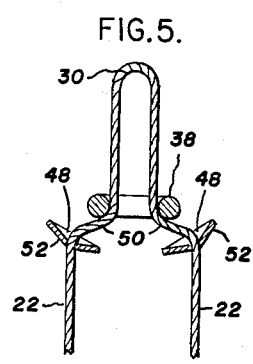
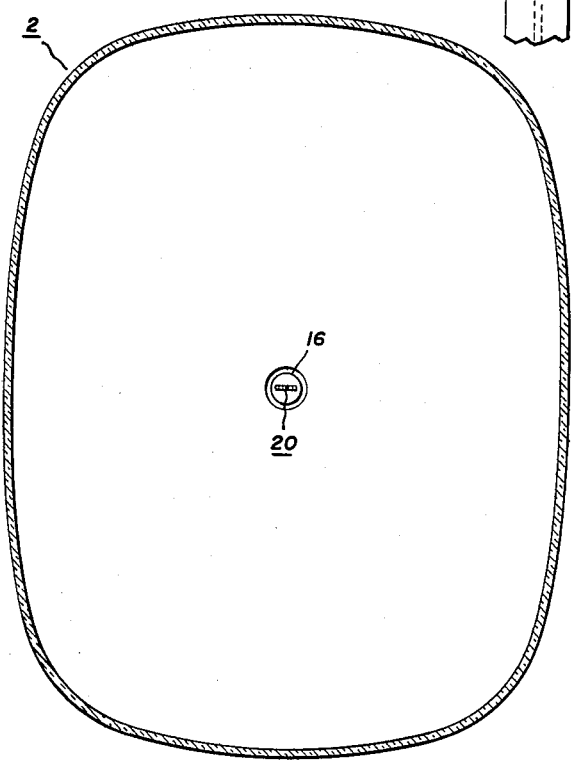
INVENTOR:
VICTOR G. BETAR,
BY Robert J. Mooney
HIS ATTORNEY.

United States Patent Office 3,246,626
Patented Apr. 19, 1966

3,246,626
METALLIZING FILAMENT
Victor G. Betar, Camillus, N.Y., assignor to General Electric Company, a corporation of New York
Filed Dec. 16, 1960, Ser. No. 76,232
5 Claims. (Cl. 118—49)

This invention relates to apparatus for evaporating a metallic layer onto the luminescent screens of cathode ray tubes such as television picture tubes or the like, and more particularly to improvements in thermal evaporating filaments for such apparatus.

Metallization of the luminescent screens of cathode ray tubes is well known in the prior art. The screen layer is first usually covered with a layer of organic film material to enhance its surface smoothness, after which the tube envelope is temporarily evacuated to a pressure in the range of about one micron of mercury, and a thin layer of a suitable metal, such as aluminum, is evaporated within the tube envelope. The metal vapor is allowed to condense on the surface of the organic film material to form a thin continuous metal layer of desirably uniform thickness having a screenwardly facing surface which is extremely smooth and mirror-like. The metal layer thus formed serves several purposes, including reflection out of the tube of light generated by the luminescent screen, to enhance picture brightness. The metal layer also protects the luminescent screen material from ion bombardment during operation of the tube, and serves to maintain the screen potential at a uniform value over the entire screen surface.

Conventionally, the metal vapor is generated within the tube envelope by placing a suitable charge of solid metal, often in the form of a short rod, within a heater in the form of a helically coiled filament of refractory metal. The filament is then heated by passing an electric current through it, and melts and vaporizes the evaporated metal charge, the metal vapor subsequently being deposited by condensation on the interior of the envelope including the film layer. With such apparatus the shape, size and position of the filamentary heater relative to the luminescent screen has an important influence on the distribution of the evaporated metal on the screen and the attainment of a desirable degree of uniformity of thickness of the evaporated metal layer.

Particularly in cathode ray tubes having rectangular face plates of larger sizes, such as those having a diagonal face plate dimension in the range of 19 to 23 inches and larger, or in tubes having wide deflection angles of 110 degrees or more with concomitantly shallow funnel portions in relation to the face plate size, where the screen subtends a large solid angle at the evaporation filament, distribution of the evaporated metal layer with a desirable uniformity of thickness has heretofore been a problem. Such aluminum thickness uniformity has an important effect on cathode ray tube picture quality and manufacturing yield, because when the metal layer is too thin a general darkening of the screen results, and if the metal layer is too thick it is susceptible to peeling and it further unduly retards the electron beam and thereby reduces picture brightness, particularly in the central portion of the screen.

Accordingly, a principal object of the present invention is to provide improved apparatus for evaporating a metallic layer onto the luminescent screen of a cathode ray tube or the like with enhanced uniformity of thickness.

Another object is to provide an improved thermal evaporation filament particularly suitable for use in the evaporation of metal onto the luminescent screens of cathode ray tubes or the like, where the screen surface to be metallized subtends a very large solid angle at the metal vapor source.

Another object is to provide an improved evaporating filament which enables evaporation of aluminum or other suitable metal onto a luminescent screen with an improved degree of uniformity of thickness, in cathode ray tubes having a face plate size in relation to funnel depth such that the electron beam deflection angle is of the order of 110° and higher.

These and other objects of the present invention will be apparent from the following description taken in conjunction with the accompanying drawing, wherein:

FIGURE 1 is a partially broken away fragmentary view of a cathode ray tube arranged for screen metallization by means of apparatus constructed according to the present invention;

FIGURE 2 is a section view of the apparatus of FIGURE 1, taken on the line 2—2 thereof;

FIGURE 3 is an enlarged fragmentary view of a portion of the apparatus of FIGURE 1, showing a metallizing filament constructed according to the present invention, and provided with a charge of metal to be vaporized;

FIGURE 4 is a view similar to FIGURE 3 and shows the filament and metal charge during an intermediate step in the evaporation process;

FIGURE 5 is an alternative form of evaporation filament constructed according to the invention; and FIGURE 6 is another alternative form of evaporation filament constructed according to my invention.

Referring to FIGURE 1, the envelope 2 of a cathode ray tube having a face plate 4 provided with a luminescent screen layer 6 to be metallized is shown supported with its neck 8 extending vertically downward into the induction throat of a vacuum pumping system 10. A suitable seal between the small end of the funnel 12 of the tube envelope and the pump is provided by gasket 14. Extending axially up through the neck 8 is an evaporation filament holder 16 which includes electrical conductors for supplying current to a pair of filament clamping terminals 18 (best shown in FIGURE 3) at its upper end.

The evaporation filament 20 of the apparatus of FIGURE 1 is best shown in enlargement in FIGURE 3. The filament 20 consists of a length of refractory metal such as tungsten, preferably made up of a plurality of strands of wire twisted together, supported on integral leg portions 22 by clamping terminals 18. The filament has a central longitudinally extending finger portion 30 formed by a U-shaped convolution of a length of refractory material, including spaced sides 31 joined by the bight portion of the U at the distal end of finger 30. At each side of the base end of finger 30 is a reservoir portion 32 formed by a reversely curved segment 34 integral with finger 30 and an integral longitudinally extending shoulder or side finger portion 36 of U-shape and of shorter length than the central finger 30. All the convolutions 30, 34, 36 of the filament 20 are preferably substantially coplanar.

In operation of the evaporation filament, a charge of metal to be evaporated is first placed on the filament. As shown in FIGURE 3 the charge may conveniently consist of an annular slug 38 of proper size to slip over finger 30 and rest on segments 34. The filament is then directly heated by passage of electric current through it, whereupon the slug of evaporable metal melts and the metal to be evaporated flows over the surface of the filament. As best shown in FIGURE 4, the reservoir portions 32 retain excess molten metal of the evaporable charge, both by a mechanical cupping action and by surface tension, and thereby provide continuous ample replenishment of liquid evaporable metal for that actually evaporated from the finger 30 and portions 36. Molten metal may also, be retained between sides 31 and within the bight portions of side fingers 36. As best shown from FIGURES 1 and 2, to insure desirable uniformity of coverage of the screen 6 with evaporated metal, the filament is positioned with the axis of finger 30 substantially coincident with the normal to the center of the screen 6, and with the plane of the finger 30 substantially parallel to the short dimension of the rectangular faceplate 4.

The planar configuration of the filament 20 maximizes distribution, in the direction normal to the plane of the filament, of metal evaporated from the filament 20.

The filament 20 shown in FIGURE 3 has many important advantages. First, it is of relatively simple form, devoid of sharp bends which with refractory material are susceptible to cracking, and hence it is relatively inexpensive to fabricate. Second it effectively holds a large charge of molten metal in its reservoir portions to insure continuous replenishment of the evaporating surfaces sufficiently for desired metallization of the larger size cathode ray tubes of 23 inch faceplate diagonal and larger. Thus, a sufficient weight of evaporable metal can be evaporated for good coverage of even those screens 6 which subtend very large solid angles at the filament, while avoiding the problem of excess molten evaporable metal inadvertently falling off or running down the legs of the filament and thereby being cooled and lost to the evaporation process. Next, the distribution of evaporated metal by the filament of FIGURE 3 has been found to provide a desirable degree of uniformity of thickness throughout the screen area, particularly in tubes whose screens subtend very large solid angles at the filament, because it deposits less evaporated metal in the center of the tube face plate and a greater amount of evaporated metal at the marginal portions of the face plate than prior art filaments. Moreover, it has been found that an improved filament constructed according to the present invention uses its entire exposed surface area as an evaporating source. This prolongs the life of the filament beacuse the refractory metal is usually very slightly soluble in the molten evaporable metal, and thus coating of the entire filament with evaporable metal and evaporating from the entire filament prevents any one portion of the filament from being unduly subjected to the dissolving action of the molten metal.

FIGURE 5 shows an alternative form of filament comprising a central forwardly extending finger 30 with a reservoir portion 48 at each side of the base thereof. The reservoir portion 48 is formed by a laterally extending segment 50 rearwardly curved at its outer end for integral connection to leg portion 22 and carrying in laterally spaced relation with the side of finger 30 an annnular disc-shaped collar 52. The collars 52 serve as holders for trapping and retaining a reservoir of molten evaporable metal close to the base of finger 30, so that such reservoir can effectively replenish evaporable metal actually discharged from finger 30 during the evaporation process. Preferably, the collars 52 are each made slightly concave or cup-shaped in the direction of finger 30, and tightly surround the segments 50 to minimize loss of molten evaporable metal down the leg portions 22.

FIGURE 6 shows another alternative construction according to my invention, wherein the reservoir portions at the base of finger 30 consist of laterally extending segments 50 each having secured thereon a molten metal holder 54 in the form of a few turns of elongate refractory material wound around the segment 50. Each holder 54 serves to collect molten evaporable metal and prevent it from falling or running down the leg portions 22, while retaining it sufficiently close to finger 30 to insure adequate replenishment of the metal evaporated from finger 30.

It will be appreciated by those skilled in the art that the invention may be carried out in various ways and may take various forms and embodiments other than those illustrative embodiments heretofore described. Accordingly, it is to be understood that the scope of the invention is not limited by the details of the foregoing description, but will be defined in the following claims.

What I claim as new and desire to secure by Letters Patent of the United States is:

1. In apparatus for thermally vacuum-evaporating metal on the inside of the face of a substantially rectangular-faced cathode ray tube envelope including means associated with bulb evacuating apparatus for supporting a bulb with the bulb face facing upwardly and the marginal edge of the bulb face defining a substantially horizontal plane, and a filament support extending through the mask of the bulb into the funnel-shaped portion of the interior thereof, a filament carried by said filament support comprising a length of refractory material including a single central finger portion having a pair of longitudinally extending generally parallel sides spaced one from the other by a distance substantially greater than the transverse dimension of said longitudinally extending sides and connected at their distal ends by a generally straight bight, said central finger portion extending toward said face, the sides of said central finger lying in a plane cutting the center of said face and being spaced therefrom by a distance less than the distance from said face to portions of said filament other than said central finger parallel to the short sides of said face, and reservoir portions for holding a charge of molten evaporable metal in replenishably coating relation with said central finger portion, said reservoir portions including integral segments of said length of refractory material extending laterally from the base ends of said sides, and retainer means associated with said laterally extending segments for impeding the flow of molten evaporable metal in contact therewith away from said central finger.

2. A filament for thermally evaporating metal onto the screen of a cathode ray tube comprising a one piece length of twisted multiple strand of refractory metal having a series of S-shaped bends forming a plurality of spaced longitudinally extending fingers including a single central finger between two side fingers, each of said fingers comprising a pair of longitudinally extending generally parallel sides spaced one from the other by a distance substantially greater than the transverse dimension of said longitudinally extending sides and connected at their distal ends by a generally straight bight, said side fingers extending along said central finger less than one-half the length thereof, said fingers being adapted to be coated with molten evaporable metal to be evaporated therefrom, the spacing between each side of the central finger and the adjacent side finger being such as to hold a reservoir of molten evaporable metal adjacent the base of said central finger, said central and side fingers being coplanar and being adapted to be arranged within a cathode ray tube of rectangular faceplate shape with said central finger extending toward said faceplate and the plane of said fingers parallel to the smaller dimension of said faceplate.

3. Apparatus as defined in claim 1 wherein said retainer means includes an annular collar on each of said laterally extending segments providing a reservoir for retaining molten evaporable metal adjacent the base of said finger.

4. Apparatus as defined in claim 1 wherein said retainer means includes at least one turn of elongated refractory metal wrapped around each of said laterally extending segments providing a reservoir for retaining molten evaporable metal adjacent the base of said finger.

5. Apparatus as defined in claim 1 wherein said retainer means includes an integral segment of said length of said refractory material reversely curved in laterally-spaced partially-overlapping relation with said finger.

References Cited by the Examiner

UNITED STATES PATENTS

| | | | |
|---|---|---|---|
| 2,239,452 | 4/1941 | Williams | 118—49.1 |
| 2,373,823 | 4/1945 | Gold | 118—49.1 X |
| 2,660,540 | 11/1953 | Karash et al. | 117—100 |
| 2,693,167 | 11/1954 | Fox et al. | 118—49 |
| 2,812,411 | 11/1957 | Moles | 118—49 X |
| 3,152,246 | 10/1964 | Van Deuren et al. | 219—553 |

FOREIGN PATENTS

| | | |
|---|---|---|
| 466,390 | 7/1950 | Canada. |
| 559,260 | 6/1958 | Canada. |

OTHER REFERENCES

"Vacuum Deposition of Thin Films" (Holland), published by Wiley (New York), 1956.

MORRIS KAPLAN, *Primary Examiner.*

ARTHUR GAUSS, RICHARD NEVIUS, CHARLES A. WILLMUTH, *Examiners.*